United States Patent
Lin et al.

(10) Patent No.: US 11,552,545 B2
(45) Date of Patent: Jan. 10, 2023

(54) POWER CONVERTER HAVING NEGATIVE CURRENT DETECTION MECHANISM

(71) Applicant: ANPEC ELECTRONICS CORPORATION, Hsinchu (TW)

(72) Inventors: Hsin-Tai Lin, Taichung (TW); Tzu-Yang Yen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 45 days.

(21) Appl. No.: 17/389,353

(22) Filed: Jul. 30, 2021

(65) Prior Publication Data
US 2022/0376599 A1 Nov. 24, 2022

(30) Foreign Application Priority Data

May 21, 2021 (TW) .................................. 110118370

(51) Int. Cl.
*H02M 3/158* (2006.01)
*H02M 1/00* (2006.01)

(52) U.S. Cl.
CPC ......... *H02M 1/0009* (2021.05); *H02M 3/158* (2013.01)

(58) Field of Classification Search
CPC ............................ H02M 3/158; H02M 1/0009
See application file for complete search history.

(56) References Cited

U.S. PATENT DOCUMENTS

| | | | | |
|---|---|---|---|---|
| 5,982,160 A | * | 11/1999 | Walters | H02M 3/156 323/222 |
| 6,127,814 A | * | 10/2000 | Goder | H02M 3/1588 323/282 |
| 6,441,597 B1 | * | 8/2002 | Lethellier | H02M 3/158 323/284 |

FOREIGN PATENT DOCUMENTS

TW 201624890 A 7/2016

* cited by examiner

*Primary Examiner* — Rafael O De Leon De Domenech
(74) *Attorney, Agent, or Firm* — Li & Cai Intellectual Property Office

(57) ABSTRACT

A power converter with a negative current detection mechanism is provided. A negative current detecting circuit includes a first operational amplifier, a first transistor and a second transistor. A non-inverting input terminal of the first operational amplifier is connected to a second terminal of a sense resistor. An inverting input terminal of the first operational amplifier is connected to a first terminal of a first capacitor. Control terminals of the first and second transistors are connected to an output terminal of the first operational amplifier. A first terminal of the first transistor is connected to the second terminal of the sense resistor. A second terminal of the first transistor is grounded. A first terminal of the second transistor is connected to the inverting input terminal of the first operational amplifier and the first terminal of the first transistor. A second terminal of the second transistor is grounded.

13 Claims, 6 Drawing Sheets

POWER CONVERTER HAVING NEGATIVE CURRENT DETECTION MECHANISM

CROSS-REFERENCE TO RELATED PATENT APPLICATION

This application claims the benefit of priority to Taiwan Patent Application No. 110118370, filed on May 21, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter with a negative current detection mechanism.

BACKGROUND OF THE DISCLOSURE

A voltage converter plays an indispensable role in an electronic device. The voltage converter is used to convert a voltage and supply the converted voltage to the electronic device. A conventional detector circuit of the voltage converter detects a current flowing through a low-side switch, and calculates a voltage value based on the detected current and an on-resistance of the low-side switch. A controller circuit of the voltage converter controls a driver circuit to switch a high-side switch and the low-side switch according to the calculated voltage value. However, when the low-side switch of the voltage converter is replaced by a new low-side switch, an on-resistance of the new low-side switch may be different from the on-resistance of the low-side switch. Therefore, the conventional detector circuit must obtain an on-resistance of the new low-side switch and calculate a new voltage value based on the detected current and the on-resistance of the new low-side switch, such as to enable the driver circuit to appropriately switch the upper-bridge switch and low-side switch according to the new voltage value.

SUMMARY OF THE DISCLOSURE

In response to the above-referenced technical inadequacies, the present disclosure provides a power converter with a negative current detection mechanism. The power converter with the negative current detection mechanism includes a high-side switch, a low-side switch, an inductor, an output capacitor, a first resistor, a first capacitor, a sense resistor and a negative current detector circuit. A first terminal of the high-side switch is connected to an input voltage. A control terminal of the high-side switch is connected to a triggering circuit. A first terminal of the low-side switch is connected to a second terminal of the high-side switch. A second terminal of the low-side switch is grounded. A control terminal of the low-side switch is connected to the triggering circuit. A first terminal of the inductor is connected to a node between the second terminal of the high-side switch and the first terminal of the low-side switch. A first terminal of the output capacitor is connected to a second terminal of the inductor, and a second terminal of the output capacitor is grounded. A first terminal of the first resistor is connected to the first terminal of the inductor. A first terminal of the first capacitor is connected to a second terminal of the first resistor. A second terminal of the first capacitor is connected to the second terminal of the inductor. A first terminal of the sense resistor is connected to the second terminal of the inductor. The negative current detector circuit includes a first operational amplifier, a first transistor and the second transistor. A non-inverting input terminal of the first operational amplifier is connected to a second terminal of the sense resistor. An inverting input terminal of the first operational amplifier is connected to the first terminal of the first capacitor. A control terminal of the first transistor is connected to an output terminal of the first operational amplifier. A first terminal of the first transistor is connected to the non-inverting input terminal of the first operational amplifier. A second terminal of the first transistor is grounded. A control terminal of the second transistor is connected to the output terminal of the first operational amplifier. A first terminal of the second transistor is coupled to a common voltage. The first terminal of the second transistor is connected to the non-inverting input terminal of the first operational amplifier and the first terminal of the first transistor. A second terminal of the second transistor is grounded.

In certain embodiments, the negative current detector circuit further includes a first current mirror circuit. An input terminal of the first current mirror circuit is connected to the first terminal of the second transistor. An output terminal of the first current mirror circuit is a first output terminal of the power converter with the negative current detection mechanism.

In certain embodiments, the first current mirror circuit includes a third transistor and a fourth transistor. A first terminal of the third transistor and a first terminal of the fourth transistor are coupled to the common voltage. A second terminal of the third transistor is connected to the first terminal of the second transistor, a control terminal of the third transistor and a control terminal of the fourth transistor. A second terminal of the fourth transistor is the first output terminal of the power converter with the negative current detection mechanism.

In certain embodiments, the power converter with the negative current detection mechanism further includes a negative current limiting circuit. The negative current limiting circuit includes a negative current determining circuit. The negative current determining circuit is connected to the second terminal of the fourth transistor and an input terminal of the triggering circuit. The negative current determining circuit is configured to output a current limiting signal to the triggering circuit to control the triggering circuit to turn on or off the high-side switch and the low-side switch according to a current flowing through the second terminal of the fourth transistor.

In certain embodiments, the power converter with the negative current detection mechanism further includes a clamping circuit. The clamping circuit is connected to the non-inverting input terminal of the first operational amplifier, the first terminal of the first transistor, the first terminal of the second transistor and the second terminal of the third transistor.

In certain embodiments, the power converter with the negative current detection mechanism further includes a negative current limiting circuit. The negative current limiting circuit includes a negative current determining circuit. The negative current determining circuit is connected to the second terminal of the fourth transistor and an input terminal of the triggering circuit. The negative current determining circuit is configured to output a current limiting signal to the triggering circuit to control the triggering circuit to turn on or off the high-side switch and the low-side switch according to a current flowing through the second terminal of the fourth transistor.

In certain embodiments, the clamping circuit includes an operational amplifier and a transistor. A first terminal of the transistor is connected to the second terminal of the third transistor. A non-inverting input terminal of the operational amplifier is connected to the first terminal of the first transistor and the non-inverting input terminal of the first operational amplifier. An inverting input terminal of the operational amplifier is connected to the first terminal of the second transistor and a second terminal of the transistor. An output terminal of the operational amplifier is connected to a control terminal of the transistor.

In certain embodiments, the power converter with the negative current detection mechanism further includes a negative current limiting circuit. The negative current limiting circuit includes a negative current determining circuit. The negative current determining circuit is connected to the second terminal of the fourth transistor and an input terminal of the triggering circuit. The negative current determining circuit is configured to output a current limiting signal to the triggering circuit to control the triggering circuit to turn on or off the high-side switch and the low-side switch according to a current flowing through the second terminal of the fourth transistor.

In certain embodiments, the negative current limiting circuit further includes a second operational amplifier. A non-inverting input terminal of the second operational amplifier is connected to the second terminal of the fourth transistor. An inverting input terminal of the second operational amplifier is coupled to a reference voltage. An output terminal of the second operational amplifier is connected to an input terminal of the negative current determining circuit.

In certain embodiments, the negative current limiting circuit further includes a resistor. A first terminal of the resistor is connected to the non-inverting input terminal of the second operational amplifier. A second terminal of the resistor is grounded.

In certain embodiments, the power converter with the negative current detection mechanism further includes a positive current detector circuit. The positive current detector circuit includes a third operational amplifier and a fifth transistor. A non-inverting input terminal of the third operational amplifier is connected to the first terminal of the first capacitor. An inverting input terminal of the third operational amplifier is connected to the second terminal of the sense resistor. An output terminal of the third operational amplifier is connected to a control terminal of the fifth transistor. A first terminal of the fifth transistor is coupled to the common voltage. A second terminal of the fifth transistor is connected to the inverting input terminal of the third operational amplifier.

In certain embodiments, the positive current detector circuit further includes a second current mirror circuit. An input terminal of the second current mirror circuit is connected to the first terminal of the fifth transistor. An output terminal of the second current mirror circuit is a second output terminal of the power converter with the negative current detection mechanism.

In certain embodiments, the second current mirror circuit includes a sixth transistor and a seventh transistor. A first terminal of the sixth transistor and a first terminal of the seventh transistor are coupled to the common voltage. A second terminal of the sixth transistor is connected to the first terminal of the fifth transistor, a control terminal of the sixth transistor and a control terminal of the seventh transistor. A second terminal of the seventh transistor is the second output terminal of the power converter with the negative current detection mechanism.

As described above, the present disclosure provides the power converter with the negative current detection mechanism. The power converter includes the negative current detector circuit. The negative current detector circuit can detect the negative current of the inductor in real time without the need for including an additional pin of the power converter. When the low-side switch of the power converter is replaced with a new low-side switch, the negative current detector circuit can still detect the negative current of the inductor without obtaining an on-resistance of the new low-side switch. In particular, when the output voltage of the power converter is low, the negative current detector circuit can still detect the negative current of the inductor. When the negative current of the inductor reaches the current threshold, the negative current limiting circuit may instruct the triggering circuit to appropriately switch the high-side switch and the low-side switch in such a way that prevents the negative current of the inductor from dropping below the current threshold.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
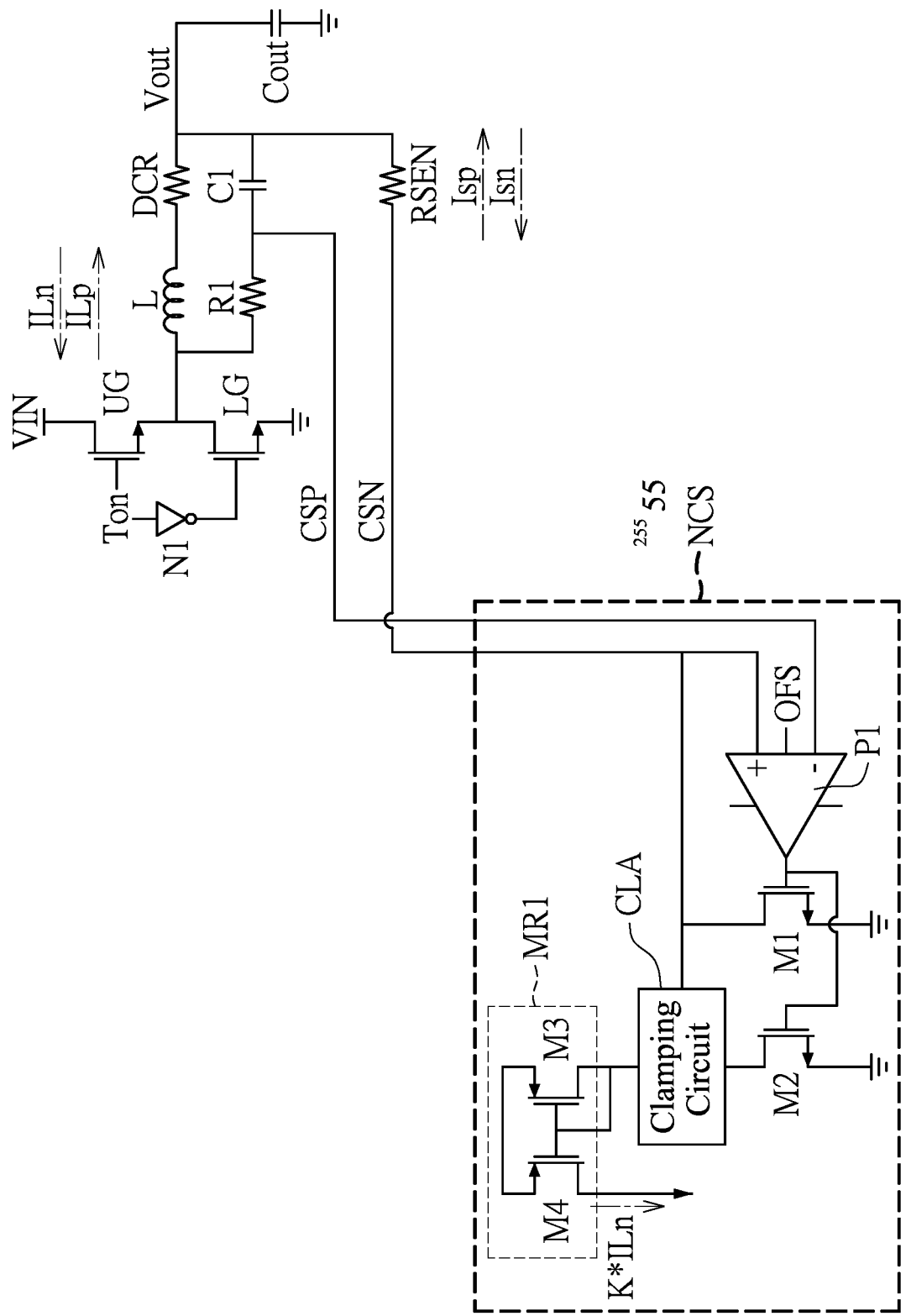
FIG. 1 is a circuit layout diagram of a power converter with a negative current detection mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Reference is made to FIG. 1, which is a circuit layout diagram of a power converter with a negative current detection mechanism according to a first embodiment of the present disclosure.

The power converter of the embodiment may include a high-side switch UG, a low-side switch LG, an inductor L, an output capacitor Cout, a first resistor R1, a first capacitor C1, a sense resistor RSEN and a negative current detector circuit NCS.

A first terminal of the high-side switch UG may be connected to an input voltage VIN. A second terminal of the high-side switch UG may be connected to a first terminal of the low-side switch LG. A second terminal of the low-side switch LG is grounded.

A control terminal of the high-side switch UG and a control terminal of the low-side switch LG are connected to a triggering circuit or directly coupled to a reference voltage level. For example, the triggering circuit may include an inverter N1, a controller circuit and a driver circuit, but the present disclosure is not limited thereto. An output terminal of the controller circuit may be connected to an input terminal of the driver circuit. An output terminal of the driver circuit may be connected to an input terminal of the inverter N1 and the control terminal of the high-side switch UG. An output terminal of the inverter N1 may be connected to the control terminal of the low-side switch LG The controller circuit may output a control signal to the driver circuit. The driver circuit may output a high-side conduction signal Ton to the high-side switch UG to control the high-side switch UG according to the control signal. In addition, the driver circuit may output the high-side conduction signal Ton to the inverter N1, and then the inverter N1 inverts the high-side conduction signal Ton to output an inverted signal to the low-side switch LG to control the low-side switch LG.

The inductor L may have a resistance DCR. A first terminal of the inductor L may be connected to a node between the second terminal of the high-side switch UG and the first terminal of the low-side switch LG. A second terminal of the inductor L may be connected to a first terminal of the output capacitor Cout. A second terminal of the output capacitor Cout is grounded.

A first terminal of the first resistor R1 may be connected to the first terminal of the inductor L. A second terminal of the first resistor R1 may be connected to a first terminal of the first capacitor C1. A second terminal of the first capacitor C1 may be connected to the second terminal of the inductor L. A first terminal of the sense resistor RSEN may be connected to a node between the second terminal of the inductor L and the first terminal of the output capacitor Cout.

It is worth noting that, the negative current detector circuit NCS may include a first operational amplifier P1, a first transistor M1 and a second transistor M2.

A non-inverting input terminal of the first operational amplifier P1 may be connected to a second terminal of the sense resistor RSEN. An inverting input terminal of the first operational amplifier P1 may be connected to a node between the first terminal of the first capacitor C1 and the second terminal of the first resistor R1. If necessary, a third input terminal of the first operational amplifier P1 may receive a bias current OFS, thereby preventing the first transistor M1 (and a fifth transistor M5 shown in FIGS. 4 and 5) from being turned on by a bias voltage of the first operational amplifier P1 such that a leakage current path is formed when a current of the inductor L is equal to a zero value.

A control terminal of the first transistor M1 may be connected to an output terminal of the first operational amplifier P1. A first terminal of the first transistor M1 may be connected to the non-inverting input terminal of the first operational amplifier P1. A second terminal of the first transistor M1 may be grounded.

A control terminal of the second transistor M2 may be connected to the output terminal of the first operational amplifier P1. A first terminal of the second transistor M2 may be coupled to a common voltage (not shown in figures). The first terminal of the second transistor M2 may be connected to the non-inverting input terminal of the first operational amplifier P1 and the first terminal of the first transistor M1. A second terminal of the second transistor M2 may be grounded. A current detected by the negative current detector circuit NCS of the power converter of the embodiment may include a current flowing through the first terminal of the second transistor M2.

If necessary, the negative current detector circuit may further include a first current mirror circuit MR1. Configurations of circuit components of the first current mirror circuit MR1 are exemplified in the embodiment, but the present disclosure is not limited thereto. An input terminal of the first current mirror circuit MR1 may be connected to the first terminal of the second transistor M2. An output terminal of the first current mirror circuit MR1 may be a first output terminal of the power converter. The current detected by the negative current detector circuit NCS of the power converter of the embodiment may include a current outputted by the output terminal of the first current mirror circuit MR1.

In detail, the first current mirror circuit MR1 may include a third transistor M3 and a fourth transistor M4. A first terminal of the third transistor M3 and a first terminal of the fourth transistor M4 may be coupled to the common voltage (not shown in figures). A second terminal of the third transistor M3 may be connected to the first terminal of the second transistor M2, a control terminal of the third transistor M3 and a control terminal of the fourth transistor M4.

A second terminal of the fourth transistor M4 may be the first output terminal of the power converter. The current detected by the negative current detector circuit NCS of the power converter of the embodiment may include a current flowing through the second terminal of the fourth transistor M4.

A ratio of a current inputted to the input terminal of the first current mirror circuit MR1 (that is the second terminal of the third transistor M3) and the current outputted by the output terminal of the first current mirror circuit MR1 (that is the second terminal of the fourth transistor M4) may be 1:K, wherein K is a ratio coefficient and may be any suitable value.

The first operational amplifier P1 is configured to multiply a gain by a difference between a voltage CSN of the non-inverting input terminal of the first operational amplifier P1 and a voltage CSP of the inverting input terminal of the first operational amplifier P1 to output a first operational amplified signal to the control terminal of the first transistor M1 and the control terminal of the second transistor M2.

The difference between the voltage CSP and the voltage CSN is positively correlated with a negative current ILn of the inductor L. Therefore, when the negative current ILn flows through the inductor L, a negative current Isn flows through the sense resistor RSEN, and the current detected by the negative current detection circuit NCS of the power converter is K times the negative current ILn, wherein a value of K depends on the ratio of the first current mirror circuit MR1. It should be understood that, if the ratio coefficient represented by K is 1, the current detected by the negative current detection circuit NCS is equal to the negative current ILn flowing through the inductor L.

If necessary, the power converter of the embodiment may include a clamping circuit CLA. The clamping circuit CLA may be connected to the non-inverting input terminal of the first operational amplifier P1 and the first terminal of the first transistor M1. The clamping circuit CLA may be connected between the first terminal of the second transistor M2 and the second terminal of the third transistor M3.

The clamping circuit CLA may be configured to clamp a voltage of the first terminal of the first transistor M1 and a voltage of the first terminal of the second transistor M2 to a target voltage such that the current detected by the negative current detection circuit NCS is K times the negative current ILn.

Second Embodiment

Figure 2:
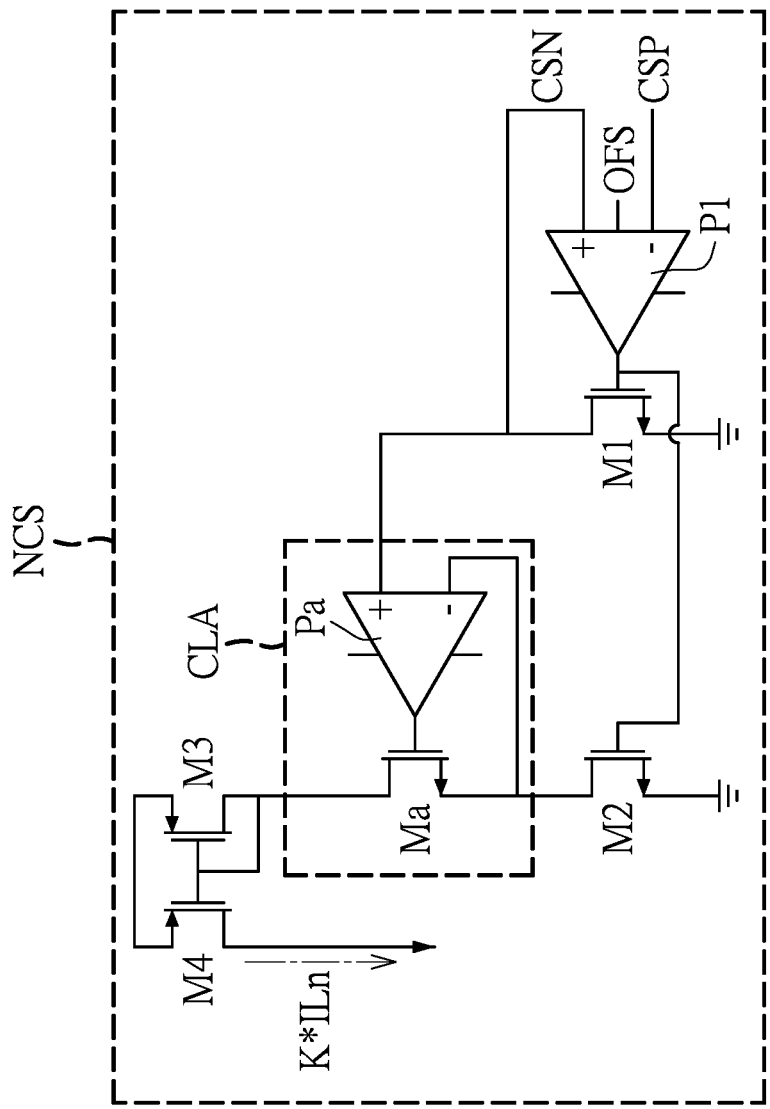
FIG. 2 is a circuit layout diagram of a negative current detector circuit of a power converter with a negative current detection mechanism according to a second embodiment of the present disclosure.

Reference is made to FIG. 2, which is a circuit layout diagram of a negative current detector circuit of a power converter with a negative current detection mechanism according to a second embodiment of the present disclosure. The same descriptions of the first and second embodiments are not repeated herein.

For example, the clamping circuit CLA of the negative current detection circuit NCS of the power converter may include an operational amplifier Pa and a transistor Ma, but the present disclosure is not limited thereto.

A first terminal of the transistor Ma may be connected to the second terminal of the third transistor M3 (that is the input terminal of the first current mirror circuit MR1). A second terminal of the transistor Ma may be connected to the first terminal of the second transistor M2.

A non-inverting input terminal of the operational amplifier Pa may be connected to the first terminal of the first transistor M1 and the non-inverting input terminal of the first operational amplifier P1. An inverting input terminal of the operational amplifier Pa may be connected to a node between the first terminal of the second transistor M2 and the second terminal of the transistor Ma. An output terminal of operational amplifier Pa may be connected to a control terminal of the transistor Ma.

Third Embodiment

Figure 3:
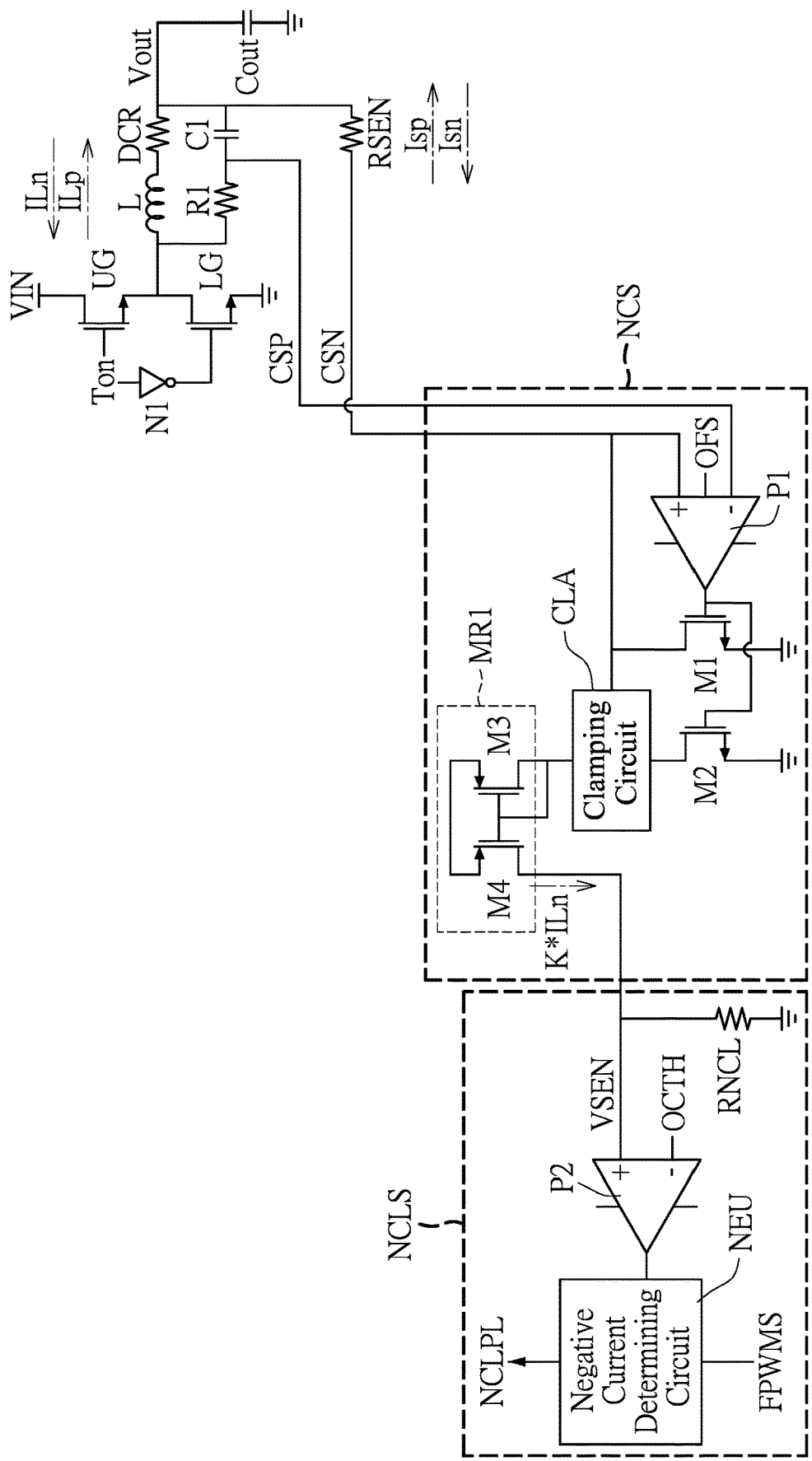
FIG. 3 is a circuit layout diagram of a power converter with a negative current detection mechanism according to a third embodiment of the present disclosure.

Reference is made to FIG. 3, which is a circuit layout diagram of a power converter with a negative current detection mechanism according to a third embodiment of the present disclosure. The same descriptions of the first and second embodiments are not repeated herein.

In the embodiment, the power converter may further include a negative current limiting circuit NCLS.

The negative current limiting circuit NCLS may include a negative current determining circuit NEU. The negative current determining circuit NEU may be directly connected to the second terminal of the fourth transistor M4 and an input terminal of the controller circuit included in the triggering circuit. The negative current determining circuit NEU may output a current limiting signal to the triggering circuit according to the current flowing through the second terminal of the fourth transistor M4. The controller circuit included in the triggering circuit controls the driver circuit to turn on or off the high-side switch UG and the low-side switch LG according to the current limiting signal.

If necessary, the negative current limiting circuit NCLS may further include a second operational amplifier P2. A non-inverting input terminal of the second operational amplifier P2 may be connected to the second terminal of the fourth transistor M4. An inverting input terminal of the second operational amplifier P2 may be coupled to a reference voltage OCTH. An output terminal of the second operational amplifier P2 may be connected to an input terminal of the negative current determining circuit NEU.

The second operational amplifier P2 may be configured to multiply a gain by a difference between a voltage VSEN of the second terminal of the fourth transistor M4 and the reference voltage OCTH to output a second operational amplified signal. The negative current determining circuit NEU may output the current limiting signal to the triggering circuit according to the second operational amplified signal. The controller circuit included in the triggering circuit controls the driver circuit to turn on or off the high-side switch UG and the low-side switch LG according to the current limiting signal.

If necessary, the negative current limiting circuit NCLS may further include a resistor RNCL. A first terminal of the resistor RNCL may be connected to the non-inverting input terminal of the second operational amplifier P2. A second terminal of the resistor RNCL may be grounded.

Fourth Embodiment

Figure 4:
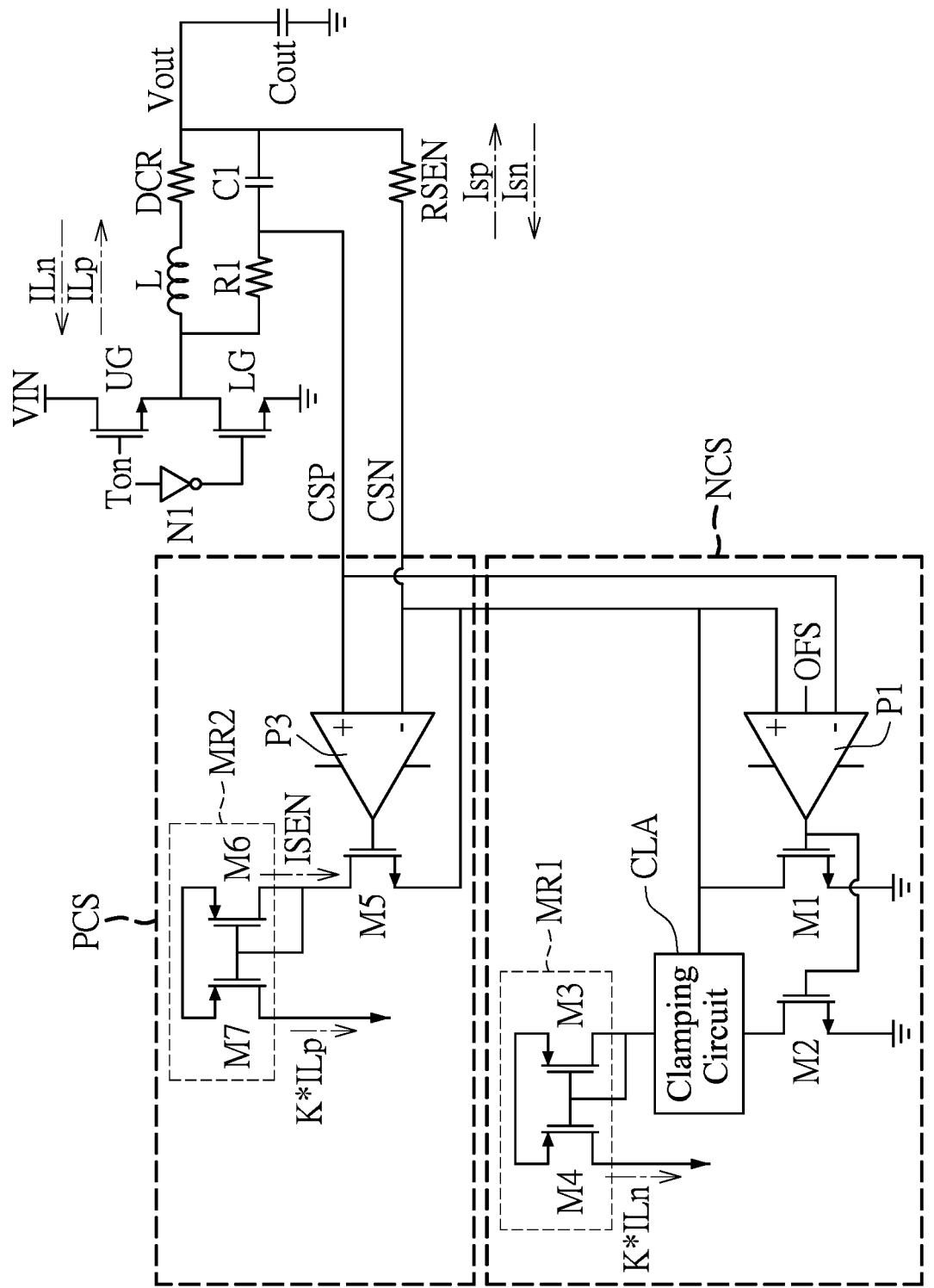
FIG. 4 is a circuit layout diagram of a power converter with a negative current detection mechanism according to a fourth embodiment of the present disclosure.

Reference is made to FIG. 4, which is a circuit layout diagram of a power converter with a negative current detection mechanism according to a fourth embodiment of the present disclosure.

The power converter of the embodiment may include the negative current detector circuit NCS and a positive current detector circuit PCS, but the present disclosure is not limited thereto. In practice, the power converter may only include one of the negative current detector circuit NCS and the positive current detector circuit PCS according to actual requirements. The negative current detector circuit NCS is used to detect the negative current ILn of the inductor L. The positive current detector circuit PCS is used to detect a positive current ILp of the inductor L.

The negative current detector circuit NCS in the fourth embodiment may be the same as the negative current detector circuit NCS in the first or second embodiment. The same descriptions are not repeated herein. The positive current detector circuit PCS is described in detail in the following.

The positive current detector circuit PCS may include a third operational amplifier P3 and a fifth transistor M5.

A non-inverting input terminal of the third operational amplifier P3 may be connected to the node between the first terminal of the first capacitor C1 and the second terminal of the first resistor R1. An inverting input terminal of the third operational amplifier P3 may be connected to the second terminal of the sense resistor RSEN. An output terminal of the third operational amplifier P3 may be connected to a control terminal of the fifth transistor M5. A first terminal of the fifth transistor M5 may be coupled to the common voltage (not shown in figures). A second terminal of the fifth transistor M5 may be connected to the inverting input terminal of the third operational amplifier P3. A current detected by the positive current detector circuit PCS of the power converter of the embodiment may include a current ISEN flowing through the first terminal of the fifth transistor M5.

If necessary, the positive current detector circuit PCS may further include a second current mirror circuit MR2. An input terminal of the second current mirror circuit MR2 may be connected to the first terminal of the fifth transistor M5. An output terminal of the second current mirror circuit MR2 may be as a second output terminal of the power converter. The current detected by the positive current detector circuit PCS of the power converter of the embodiment may include a current outputted by the output terminal of the second current mirror circuit MR2.

In detail, the second current mirror circuit MR2 may include a sixth transistor M6 and a seventh transistor M7. A first terminal of the sixth transistor M6 and a first terminal of the seventh transistor M7 are coupled to the common voltage (not shown in figures). A second terminal of the sixth transistor M6 may be connected to the first terminal of the fifth transistor M5, a control terminal of the sixth transistor M6 and a control terminal of the seventh transistor M7. A second terminal of the seventh transistor M7 may be as the second output terminal of the power converter. The current detected by the positive current detector circuit PCS of the power converter of the embodiment may include a current outputted by an output terminal of the seventh transistor M7.

A ratio of a current inputted to the input terminal of the second current mirror circuit MR2 (that is the second terminal of the sixth transistor M6) and the current outputted by the output terminal of the second current mirror circuit MR2 (that is the second terminal of the seventh transistor M7) may be 1:K, wherein K is the ratio coefficient and may be any suitable value.

The difference between the voltage CSP and the voltage CSN is positively correlated with the positive current ILp of the inductor L. Therefore, when the positive current ILp flows through the inductor L, a positive current Isp flows through the sense resistor RSEN, and the current detected by the positive current detector circuit PCS is K times the positive current ILp, wherein the value of K depends on the ratio of the second current mirror circuit MR2. It should be understood that, if the ratio coefficient represented by K is 1, the current detected by the positive current detector circuit PCS is equal to the positive current ILp flowing through the inductor L.

Fifth Embodiment

Figure 5:
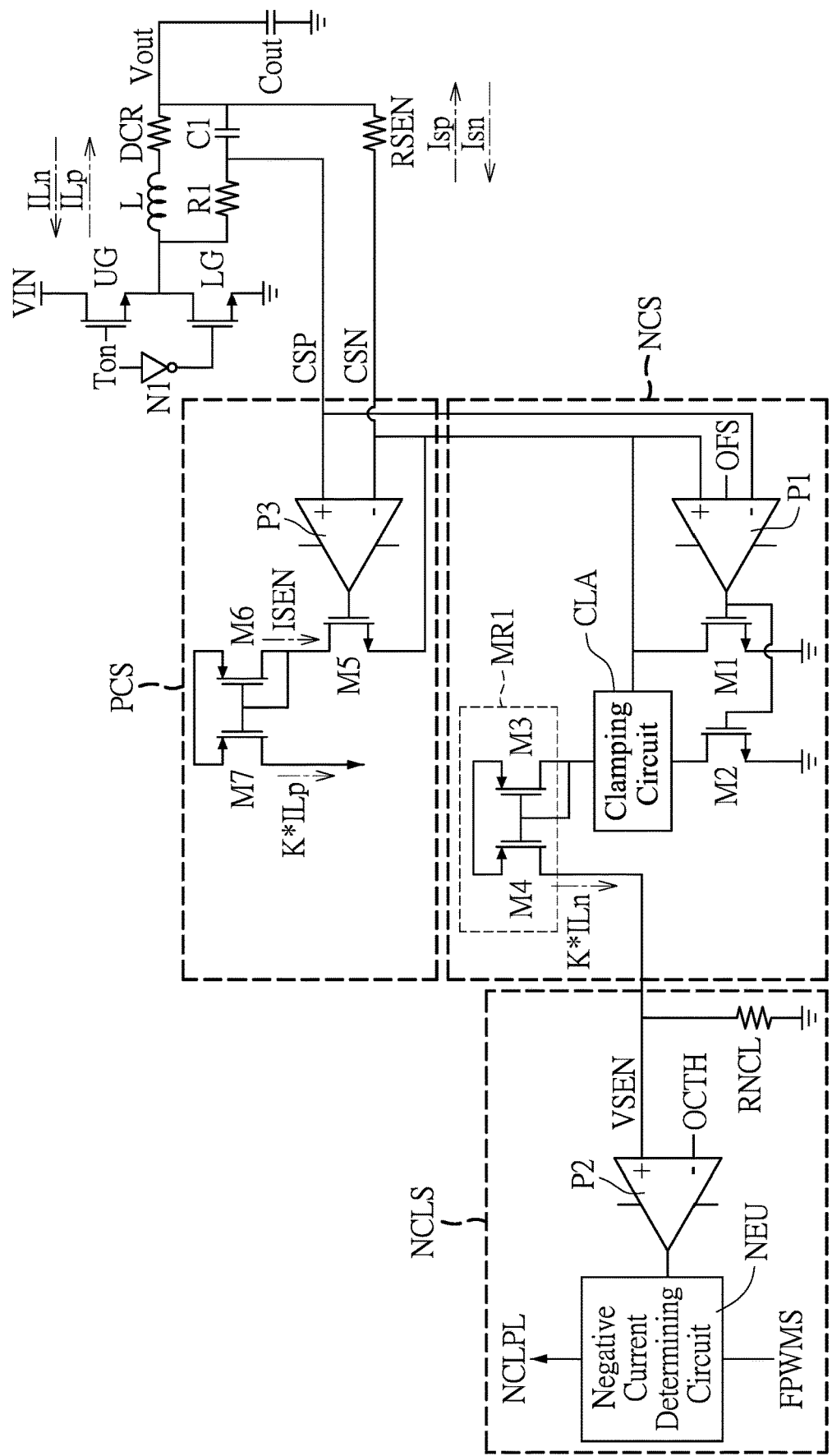
FIG. 5 is a circuit layout diagram of a power converter with a negative current detection mechanism according to a fifth embodiment of the present disclosure.
Figure 6:
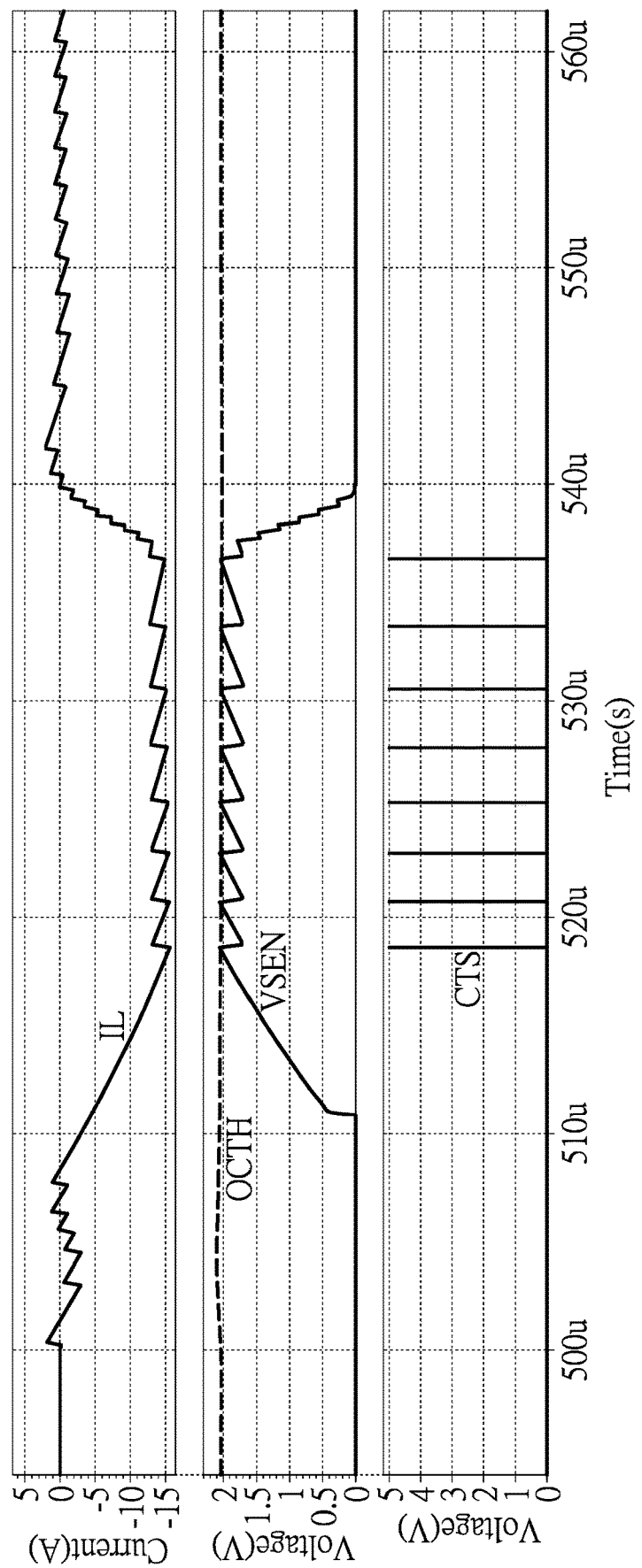
FIG. 6 is a waveform diagram of signals of the power converter with the negative current detection mechanism according to the fifth embodiment of the present disclosure.

Reference is made to FIGS. 5 and 6, in which FIG. 5 is a circuit layout diagram of a power converter with a negative current detection mechanism according to a fifth embodiment of the present disclosure, and FIG. 6 is a waveform diagram of signals of the power converter with the negative current detection mechanism according to the fifth embodiment of the present disclosure.

As shown in FIG. 5, the power converter of the embodiment may include the high-side switch UG, the low-side switch LG, the inductor L, the output capacitor Cout, the first resistor R1, the first capacitor C1, the sense resistor RSEN, the positive current detector circuit PCS, the negative current detector circuit NCS and the negative current limiting circuit NCLS, the configurations of which are described above. The same descriptions are not repeated herein.

It is worth noting that, when an output voltage Vout of the power converter is too small, the positive current detector circuit PCS cannot be used to detect the current that is smaller than a zero value, which is caused by a margin voltage of the second current mirror MR2. Therefore, in the embodiments of the present disclosure, the configurations of the circuit components of the positive current detector circuit PCS are adjusted to form the negative current limiting circuit NCLS that is capable of detecting the negative current ILn of the inductor L.

When the output voltage Vout of an output terminal of the power converter slowly decreases, the negative current determining circuit NEU instructs the triggering circuit to turn on the low-side switch LG such that the low-side switch LG is discharged toward the output terminal of the power converter according to a frequency pulse width modulation signal FPWMS received from an external circuit. At this time, a current IL of the inductor L is the negative current ILn and flows from the output terminal of the power converter through the low-side switch LG to ground.

When the current IL of the inductor L decreases to be smaller than a current threshold, the voltage VSEN of a first input terminal such as the non-inverting input terminal of the second operational amplifier P2 reaches the reference voltage OCTH. At this time, the negative current determining circuit NEU may output a low-side instructing signal NCLPL according to the second operational amplified signal at a high level that is outputted by the second operational amplifier P2. The triggering circuit outputs the high-side conduction signal Ton to the high-side switch UG to turn on the high-side switch UG according to the low-side instructing signal NCLPL. In addition, the triggering circuit outputs the high-side conduction signal Ton to the inverter N1, and then the inverter N1 inverts the high-side conduction signal Ton to output the inverted signal to the low-side switch LG to turn off the low-side switch LG.

After an on-time of the high-side conduction signal Ton ends, the low-side switch LG is turned on, and the high-side switch UG is turned off. The high-side switch UG and the low-side switch LG are alternatively turned on such that the high-side switch UG or the low-side switch LG is turned on only for a short period of time each. As a result, the current IL of the inductor L is limited and cannot decrease to be smaller than the current threshold, thereby preventing the low-side switch LG of the power converter from being damaged. A switch switching signal CTS shown in FIG. 6 is at a high level, which represents that the high-side switch UG and the low-side switch LG are switched.

In summary, the present disclosure provides the power converter with the negative current detection mechanism. The power converter includes the negative current detector circuit. The negative current detector circuit can detect the negative current of the inductor in real time without the need for including an additional pin of the power converter. When the low-side switch of the power converter is replaced with a new low-side switch, the negative current detector circuit can still detect the negative current of the inductor without obtaining an on-resistance of the new low-side switch. In particular, when the output voltage of the power converter is low, the negative current detector circuit can still detect the negative current of the inductor. When the negative current of the inductor reaches the current threshold, the negative current limiting circuit may instruct the triggering circuit to appropriately switch the high-side switch and the low-side switch in such a way that prevents the negative current of the inductor from dropping below the current threshold.

These and other aspects of the present disclosure will become apparent from the following description of the embodiment taken in conjunction with the following drawings and their captions, although variations and modifications therein may be affected without departing from the spirit and scope of the novel concepts of the disclosure.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter having a negative current detection mechanism, comprising:
   a high-side switch, wherein a first terminal of the high-side switch is connected to an input voltage, and a control terminal of the high-side switch is connected to a triggering circuit;
   a low-side switch, wherein a first terminal of the low-side switch is connected to a second terminal of the high-side switch, a second terminal of the low-side switch is grounded, and a control terminal of the low-side switch is connected to the triggering circuit;
   an inductor, wherein a first terminal of the inductor is connected to a node between the second terminal of the high-side switch and the first terminal of the low-side switch,
   an output capacitor, wherein a first terminal of the output capacitor is connected to a second terminal of the inductor, and a second terminal of the output capacitor is grounded;
   a first resistor, wherein a first terminal of the first resistor is connected to the first terminal of the inductor;
   a first capacitor, wherein a first terminal of the first capacitor is connected to a second terminal of the first resistor, and a second terminal of the first capacitor is connected to the second terminal of the inductor;
   a sense resistor, wherein a first terminal of the sense resistor is connected to the second terminal of the inductor; and
   a negative current detector circuit, including:
      a first operational amplifier, wherein a non-inverting input terminal of the first operational amplifier is connected to a second terminal of the sense resistor, and an inverting input terminal of the first operational amplifier is connected to the first terminal of the first capacitor;
      a first transistor, wherein a control terminal of the first transistor is connected to an output terminal of the first operational amplifier, a first terminal of the first transistor is connected to the non-inverting input terminal of the first operational amplifier, and a second terminal of the first transistor is grounded; and
      a second transistor, wherein a control terminal of the second transistor is connected to the output terminal of the first operational amplifier, a first terminal of the second transistor is coupled to a common voltage, the first terminal of the second transistor is connected to the non-inverting input terminal of the first operational amplifier and the first terminal of the first transistor, and a second terminal of the second transistor is grounded.

2. The power converter with the negative current detection mechanism according to claim 1, wherein the negative current detector circuit further includes a first current mirror circuit, an input terminal of the first current mirror circuit is connected to the first terminal of the second transistor, and an output terminal of the first current mirror circuit is a first output terminal of the power converter.

3. The power converter with the negative current detection mechanism according to claim 2, wherein the first current mirror circuit includes a third transistor and a fourth transistor, a first terminal of the third transistor and a first terminal of the fourth transistor are coupled to the common voltage, a second terminal of the third transistor is connected to the first terminal of the second transistor, a control terminal of the third transistor and a control terminal of the fourth transistor, and a second terminal of the fourth transistor is the first output terminal of the power converter with the negative current detection mechanism.

4. The power converter with the negative current detection mechanism according to claim 3, further comprising:
   a negative current limiting circuit including a negative current determining circuit, wherein the negative current determining circuit is connected to the second terminal of the fourth transistor and an input terminal of the triggering circuit, and the negative current determining circuit is configured to output a current limiting signal to the triggering circuit to control the triggering circuit to turn on or off the high-side switch and the low-side switch according to a current flowing through the second terminal of the fourth transistor.

5. The power converter with the negative current detection mechanism according to claim 3, further comprising:
   a clamping circuit connected to the non-inverting input terminal of the first operational amplifier, the first terminal of the first transistor, the first terminal of the second transistor and the second terminal of the third transistor.

6. The power converter with the negative current detection mechanism according to claim 5, further comprising:
   a negative current limiting circuit including a negative current determining circuit, wherein the negative current determining circuit is connected to the second terminal of the fourth transistor and an input terminal of the triggering circuit, the negative current determining circuit is configured to output a current limiting signal to the triggering circuit to control the triggering circuit to turn on or off the high-side switch and the low-side switch according to a current flowing through the second terminal of the fourth transistor.

7. The power converter with the negative current detection mechanism according to claim 5, wherein the clamping circuit includes an operational amplifier and a transistor, wherein a first terminal of the transistor is connected to the second terminal of the third transistor, a non-inverting input terminal of the operational amplifier is connected to the first terminal of the first transistor and the non-inverting input terminal of the first operational amplifier, an inverting input terminal of the operational amplifier is connected to the first terminal of the second transistor and a second terminal of the transistor, and an output terminal of the operational amplifier is connected to a control terminal of the transistor.

8. The power converter with the negative current detection mechanism according to claim 7, further comprising:
a negative current limiting circuit including a negative current determining circuit, wherein the negative current determining circuit is connected to the second terminal of the fourth transistor and an input terminal of the triggering circuit, and the negative current determining circuit is configured to output a current limiting signal to the triggering circuit to control the triggering circuit to turn on or off the high-side switch and the low-side switch according to a current flowing through the second terminal of the fourth transistor.

9. The power converter with the negative current detection mechanism according to claim 8, wherein the negative current limiting circuit further includes a second operational amplifier, a non-inverting input terminal of the second operational amplifier is connected to the second terminal of the fourth transistor, an inverting input terminal of the second operational amplifier is coupled to a reference voltage, and an output terminal of the second operational amplifier is connected to an input terminal of the negative current determining circuit.

10. The power converter with the negative current detection mechanism according to claim 9, wherein the negative current limiting circuit further includes a resistor, a first terminal of the resistor is connected to the non-inverting input terminal of the second operational amplifier, and a second terminal of the resistor is grounded.

11. The power converter with the negative current detection mechanism according to claim 1, further comprising:
a positive current detector circuit including a third operational amplifier and a fifth transistor, a non-inverting input terminal of the third operational amplifier is connected to the first terminal of the first capacitor, an inverting input terminal of the third operational amplifier is connected to the second terminal of the sense resistor, an output terminal of the third operational amplifier is connected to a control terminal of the fifth transistor, a first terminal of the fifth transistor is coupled to the common voltage, and a second terminal of the fifth transistor is connected to the inverting input terminal of the third operational amplifier.

12. The power converter with the negative current detection mechanism according to claim 11, wherein the positive current detector circuit further includes a second current mirror circuit, an input terminal of the second current mirror circuit is connected to the first terminal of the fifth transistor, and an output terminal of the second current mirror circuit is a second output terminal of the power converter with the negative current detection mechanism.

13. The power converter with the negative current detection mechanism according to claim 12, wherein the second current mirror circuit includes a sixth transistor and a seventh transistor, a first terminal of the sixth transistor and a first terminal of the seventh transistor are coupled to the common voltage, a second terminal of the sixth transistor is connected to the first terminal of the fifth transistor, a control terminal of the sixth transistor and a control terminal of the seventh transistor, and a second terminal of the seventh transistor is the second output terminal of the power converter with the negative current detection mechanism.

* * * * *